CHARLES J. ARLINGTON.

Improvement in Harvester-Rakes.

No. 4,905. Reissued May 14, 1872.

Witnesses.

G. A. Sluizer
Edmund Masson

Charles J. Arlington
Ass.r to C. Wheeler Jr.

By atty.
A. B. Stoughton.

A.M. PHOTO-LITHOGRAPHIC CO. N.Y. (OSBORNE'S PROCESS.)

UNITED STATES PATENT OFFICE.

CYRENUS WHEELER, JR., OF AUBURN, NEW YORK, ASSIGNEE OF CHARLES J. ARLINGTON.

IMPROVEMENT IN HARVESTER-RAKES.

Specification forming part of Letters Patent No. 79,539, dated July 7, 1868; reissue No. 4,905, dated May 14, 1872.

*To all whom it may concern:*

Be it known that CHARLES J. ARLINGTON, of the city of Auburn, in the county of Cayuga and State of New York, did invent certain new and useful Improvements in Combined Rakes and Reels for Harvesters; and that the following is a full, clear, and exact description of the same, reference being had to the accompanying drawing and the letters of reference marked thereon forming part of this specification, in which—

Figure 1:
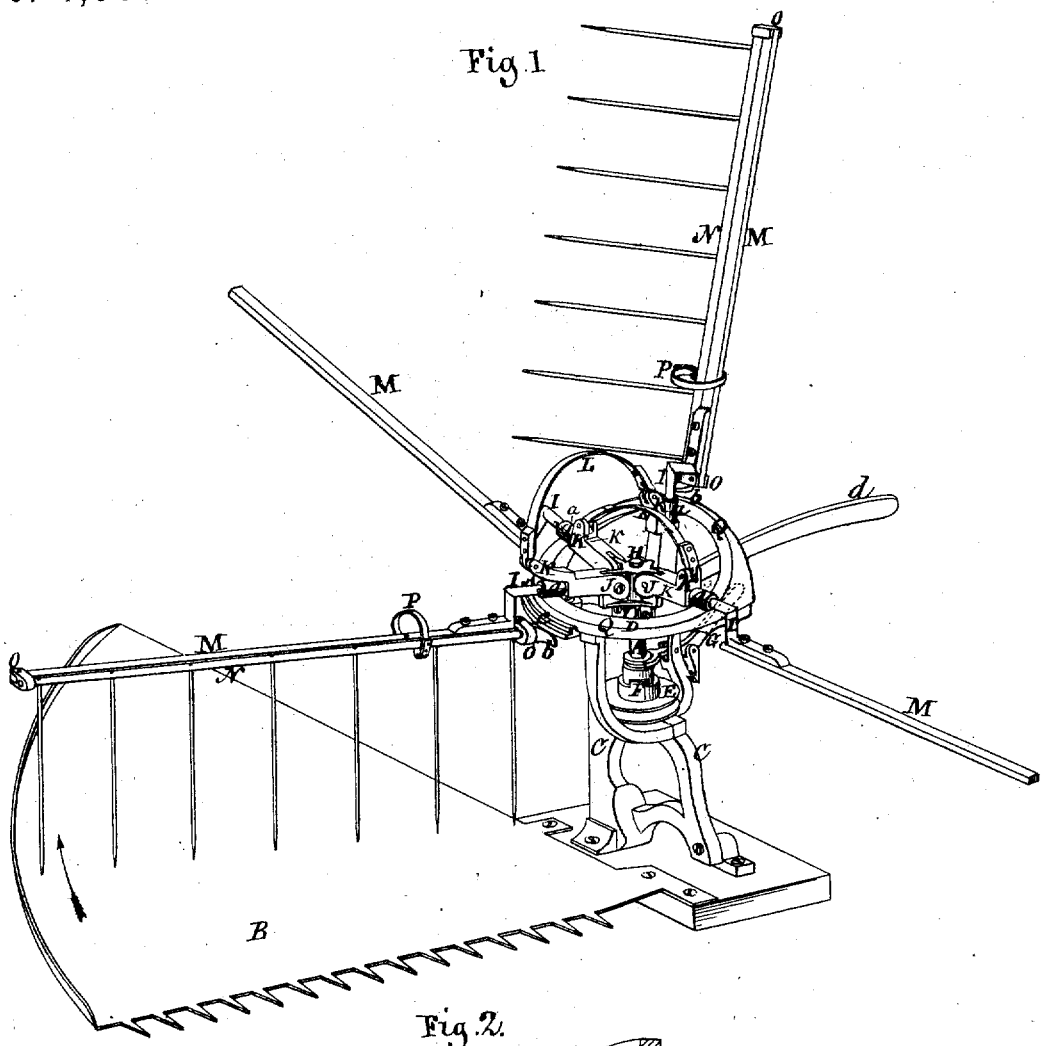
Figure 2:
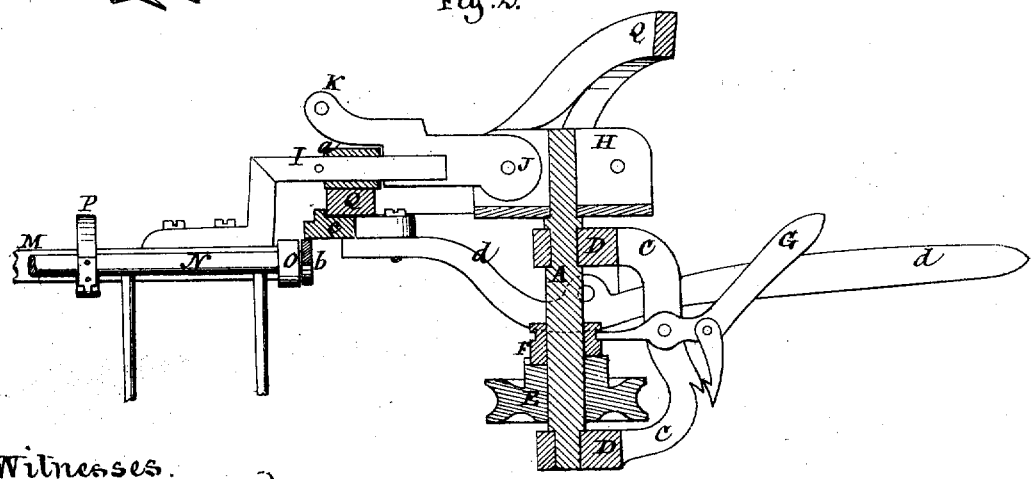

Figure 1 represents in perspective the combined rake and reel as applied to the platform and cutting apparatus of a harvester. Fig. 2 represents a vertical section of the same passing through the vertical spindle or axis on which the wings of the reel are mounted.

The same letters where they occur in the separate figures denote like parts of the apparatus in the drawing.

The invention consists in combining with a reel-rake and a stationary cam-track a movable track, hinged to a horizontal axis so that when raised up its under side will form between the rake-heads and their pivots a track parallel to the surface of the platform for bringing the teeth of the rake-heads down and holding them to the platform, substantially as described. And the invention further consists in combining with the rocking or rolling rake-heads, the cam for holding them in action, and the retracting springs for causing the rake-teeth to rock backward in discharging the grain from the platform.

To enable others skilled in the art to make and use this invention, the following description is given.

The spindle or shaft A is supported in a position nearly vertical to the plane of the platform B by a frame, C, having suitable bearings D in which the spindle A is free to turn. Between the bearings D on the spindle A is loosely placed driving-pulley E, by which motion is imparted to the spindle A by a chain or band connecting with the moving parts of the machine. A clutch, F, operated by a lever, G, serves to connect the pulley E to or disconnect it from the spindle A at pleasure. Affixed to the top of spindle A is a head or ear-piece, H, to which arms I are hinged at J. The arms I have near their middle, on their upper sides, ears K, to which are hinged the springs L. The arms I, at their outer ends, are fastened to the reel-wings M. To two of the reel-wings are fastened rakes N, having bearings O in which they are free to rock or turn. To the rakes N is hinged one end of a spring, P, the other end being fastened to the wings M. A track or cam-way, Q, is fastened on top of and supported by the frame or stand C. The arms I have each a friction-roller, *a*, connected with them, which travel on this track. The track Q is so formed as to raise the arms I and the rakes and wings they carry from a horizontal to nearly a vertical position, as they pass around from the discharging side of the platform, and then lower them again to a horizontal position at the gathering side of the platform, and permit the arms to pass over the platform parallel to its surface. The reel-wings M project inwardly from their points of connection with the arms I toward the vertical axis A. To the inner ends of the rakes, and inside of the bearing O, is fastened an elbow piece, *b*, which projects beyond the outer circumference of the track or cam *c*. The pieces *b* are arranged so as to stand at right angles to the teeth of the rakes. To the frame C is hinged, by an axis nearly horizontal, a supplementary cam or track piece, *c*. This track is free to vibrate on its axis below a plane parallel to the platform, and when raised up to the fixed track which limits its rise forms a track having a surface on its under side parallel to the upper surface of the platform outside of the track Q, and serves to engage the projecting elbow pieces *b*, which pass under it in discharging the accumulated gavel, and hold the teeth of the rake down to the platform in their passage over it.

In operation, the wings of the reel are moved across the platform B in the direction of the arrow, the arms I which carry the wings M being connected together in pairs by the springs L, are kept down to the track Q and follow closely its surface, which, on that side next to the platform, is parallel to it, and on the other side nearly vertical, the rollers *a* relieving the arms I from undue friction. The wings M revolve over the platform parallel to it, and at sufficient distance above not to disturb the fallen grain. As the wings pass the rear of the platform they rise to a vertical position and pass forward, where they are depressed and dip into the standing grain and bring it back to the cutters, where it is severed and falls upon the platform. When a sufficient quantity has collected on the platform for a sheaf the driver, by means of the lever *d*, brings the cam *c* up to the track Q, and as the wings M carrying the rakes N reach the front of the platform, the projecting elbow pieces *b* pass under the front end of the cam *c*, and the teeth of the rake-heads are brought down to the platform, the points of the teeth traveling close to the platform, and sweep the grain to the ground on the delivery side of the platform, at which point the projecting pieces *b* pass out from under the rear end of the cam *c*, and the rakes rock back on their longitudinal axis and are free to be raised again to a vertical position by the track Q. By raising the cam *c* up and keeping it in contact with the under side of the track Q, the rakes will each be operated as they pass over the platform, and will sweep the accumulated grain off twice to each revolution of the reel. By removing one of the rakes and fastening the cam *c*, as described, the grain will be swept from the platform but once at each revolution.

It will thus be seen that, by this arrangement, the operator can control the size of the bundles by delivering the grain from the platform at pleasure, which is an advantage where the crop to be cut varies in stoutness in different parts of the same field. He can also, where the crop is stout and uniform, deliver the grain at uniform distances by keeping the cam *c* up to the track Q; and where uniform, but thin on the ground, by removing one rake, and operating in the same way, uniformity of distance in delivery and sufficient size of bundles may be obtained.

By rocking back the rake-teeth in the manner described, they not only pass over the platform without disturbing the fallen grain, but they do not interfere with the wings M in the processs of reeling down the grain. When elevated to a vertical position, in passing from the delivery to the front or cutting side of the platform, the teeth of the rakes being turned back, less space is required, and the driver has more room on the machine.

What is claimed herein as the invention of CHARLES J. ARLINGTON, and desired to be secured by Letters Patent, is—

1. The combination, substantially as described, with a reel-rake and a stationary cam-track, of a movable track hinged to a horizontal axis, so that when raised up its under side will form, between the rake-heads and their pivots, a track parallel to the surface of the platform, for bringing the teeth of the rake-heads down and holding them to the platform.

2. The combination, substantially as described, of rolling rake-heads, the cam for holding them in action, and the retracting spring for rolling the rake-teeth backward when discharging the grain from the platform.

C. WHEELER, JR.

Witnesses:
A. B. STOUGHTON,
EDMUND MASSON.